US009692252B2

United States Patent
Huang

(10) Patent No.: US 9,692,252 B2
(45) Date of Patent: Jun. 27, 2017

(54) LOCK WIRELESS CHARGING SYSTEM

(71) Applicant: JSW Pacific Corporation, New Taipei (TW)

(72) Inventor: Chih-Sheng Huang, New Taipei (TW)

(73) Assignee: JSW PACIFIC CORPORATION, New Taipei (TW)

( * ) Notice: Subject to any disclaimer, the term of this patent is extended or adjusted under 35 U.S.C. 154(b) by 112 days.

(21) Appl. No.: 14/946,598

(22) Filed: Nov. 19, 2015

(65) Prior Publication Data

US 2017/0149265 A1 May 25, 2017

(51) Int. Cl.
*H02J 7/00* (2006.01)
*H02J 7/02* (2016.01)
*H04W 4/00* (2009.01)

(52) U.S. Cl.
CPC ........... *H02J 7/025* (2013.01); *H02J 7/0052* (2013.01); *H04W 4/008* (2013.01)

(58) Field of Classification Search
CPC .......... H02J 5/005; H02J 7/025; H02J 7/0052; H02J 50/00; H02J 50/10
USPC ....................................................... 320/108
See application file for complete search history.

(56) References Cited

U.S. PATENT DOCUMENTS

2012/0126745 A1\* 5/2012 Partovi ................ H02J 7/0027
320/108

\* cited by examiner

*Primary Examiner* — Paul Dinh
(74) *Attorney, Agent, or Firm* — Chun-Ming Shih; HDLS IPR Services

(57) ABSTRACT

A lock wireless charging system includes a gateway (10) and a door lock (20). The gateway (10) includes a first micro-processing unit (101), a first signal-fetching unit (102), a first charging unit (103), a first signal-processing unit (104) and a first antenna unit (105). The door lock (20) includes a second micro-processing unit (201), a second signal-fetching unit (202), a second charging unit (203), a second signal-processing unit (204), a second antenna unit (205) and a storage unit (206). The first antenna unit (105) outputs the identification and sensing signals. The door lock (20) fetches and transmits the identification signal to the second micro-processing unit (201) to determine. The second micro-processing unit (201) responds to the first micro-processing unit (101) with a responsive identification signal. If the identification is successful, the sensing signal is converted into electricity, so the second charging unit (203) charges the storage unit (206).

13 Claims, 3 Drawing Sheets

LOCK WIRELESS CHARGING SYSTEM

BACKGROUND OF THE INVENTION

Field of the Invention

The present invention relates to a lock, and especially relates to a wireless charging system arranged inside the lock.

Description of the Related Art

As technology progresses, many non-electronic products become electronic products. For example, the traditional locks become the electronic locks to avoid bringing a lot of keys or chip cards.

In recent years, the electronic locks are installed in new buildings or offices. Currently, there are several kinds of electronic locks. They are the push-button type combination lock, the induction type chip lock, the biometric recognition lock and the electronic locks which are unlocked by the Bluetooth or NFC technology. The electronic lock has the anti-theft design and may frighten burglars. If the electronic lock has the audible alarm, the thief may be frightened and then runs away. Moreover, by using the communication software or Internet, the electronic lock can inform the police or security to come to check.

Although the electronic lock has the anti-theft design and may frighten burglars, the conventional electronic lock consumes a lot of power. Some electronic locks even need to replace batteries every one to two months. It is very inconvenient to the users. Moreover, the electronic lock needs to replace batteries, so that the structure design of the electronic lock is limited, and may have the security risk.

SUMMARY OF THE INVENTION

Therefore, the main object of the present invention is to solve the above-mentioned problems. The present invention integrates the wireless charging and communication module into the lock. Before wireless charging, the present invention proceeds with the identification between the gateway and the door lock. After identifying to each other successfully, the gateway charges the door lock, so that the user does not need to replace batteries.

Another object of the present invention is to arrange a backup power inside the gateway. When there is a power failure, the backup power provides the gateway with power for charging the door lock.

In order to achieve the object mentioned above, the present invention provides a lock wireless charging system which includes a gateway and a door lock. The gateway includes a first micro-processing unit, a first signal-fetching unit, a first charging unit, a first signal-processing unit, a first antenna unit and a backup storage unit. The door lock includes a second micro-processing unit, a second signal-fetching unit, a second charging unit, a second signal-processing unit, a second antenna unit and a storage unit. The first micro-processing unit outputs an identification signal to the first signal-processing unit, and the first charging unit outputs a direct current pulse wave to the first signal-processing unit. The first signal-processing unit sends the identification signal to the first antenna unit. The first antenna unit transmits the identification signal to the second antenna unit. The second signal-fetching unit fetches the identification signal from the second antenna unit and sends the identification signal to the second micro-processing unit. The second micro-processing unit identifies the identification signal to generate and transmit a responsive identification signal to the first antenna unit of the gateway through the second signal-processing unit and the second antenna unit. The first signal-fetching unit fetches the responsive identification signal from the first antenna unit and sends the responsive identification signal to the first micro-processing unit. The first micro-processing unit determines that an identification between the gateway and the door lock is successful, and then the first charging unit outputs the direct current charging pulse wave to the first antenna unit through the first signal-processing unit. The first antenna unit outputs the direct current charging pulse wave to generate a magnetic electric field, so that the second antenna unit induces or resonates the magnetic electric field to obtain an induced signal and then sends the induced signal to the second charging unit. The second charging unit converts the induced signal into a charging direct current to charge the storage unit.

In an embodiment of the present invention, the first micro-processing unit is a micro-processor, and the second micro-processing unit is a micro-processor.

In an embodiment of the present invention, the first signal-fetching unit is a signal-fetching circuit, and the second signal-fetching unit is a signal-fetching circuit.

In an embodiment of the present invention, the first signal-processing unit is a signal adder, a mixer or an antenna driver. The second signal-processing unit is a signal adder, a mixer or an antenna driver.

In an embodiment of the present invention, the first charging unit is a wireless charging signal and power supply unit.

In an embodiment of the present invention, the second charging unit is a wireless charging signal conversion and charging unit.

In an embodiment of the present invention, the first antenna unit is an electromagnetic coil, and the second antenna unit is an electromagnetic coil.

In an embodiment of the present invention, the gateway further comprises a power supply unit electrically connected to the first micro-processing unit. The power supply unit receives an external alternating current power and converts the external alternating current power into a direct current power to provide the gateway with a required direct current power. The power supply unit at least comprises a rectifying circuit and a voltage-stabilizing circuit.

In an embodiment of the present invention, the gateway further comprises a backup storage unit electrically connected to the first charging unit.

In an embodiment of the present invention, the storage unit is a rechargeable battery, a battery capacitor or a double-layer capacitor. The backup storage unit is a rechargeable battery, a battery capacitor or a double-layer capacitor.

In an embodiment of the present invention, the identification signal is a digital encoding signal.

In an embodiment of the present invention, the gateway further comprises a first Bluetooth unit. The door lock further comprises a second Bluetooth unit. The first Bluetooth unit is electrically connected to the first micro-processing unit. The second Bluetooth unit is electrically connected to the second micro-processing unit. The gateway and the door lock communicate with each other by the first Bluetooth unit and the second Bluetooth unit.

In an embodiment of the present invention, after the first Bluetooth unit is coupled connected to the second Bluetooth unit, a signal strength between the first Bluetooth unit and the second Bluetooth unit is detected to obtain a distance between the gateway and the door lock, so that the first micro-processing unit controls a charging current outputted from the first charging unit according to the distance.

DETAILED DESCRIPTION OF THE INVENTION

Please refer to following detailed description and figures for the technical content of the present invention.

Figure 1:
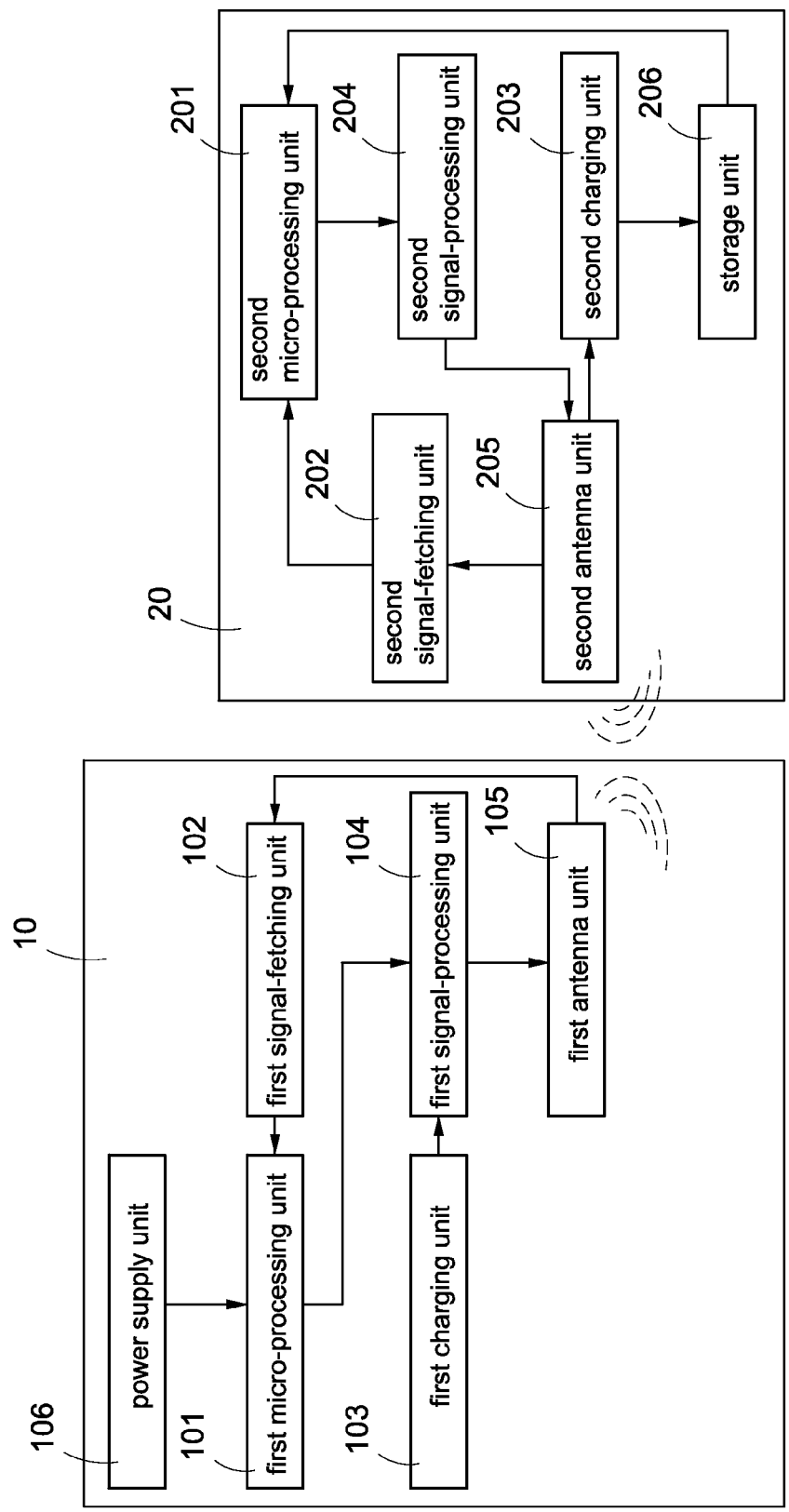
FIG. 1 shows a block diagram of the first embodiment of the lock wireless charging system of the present invention.

FIG. 1 shows a block diagram of the first embodiment of the lock wireless charging system of the present invention. As shown in FIG. 1, the lock wireless charging system comprises a gateway 10 and a door lock 20.

The gateway 10 includes a first micro-processing unit 101, a first signal-fetching unit 102, a first charging unit 103, a first signal-processing unit 104, a first antenna unit 105 and a power supply unit 106.

The first micro-processing unit 101 comprises software applications to determine a responsive identification signal which is transmitted from the door lock 20 and fetched by the first signal-fetching unit 102, and to generate and transmit an identification signal to the first signal-processing unit 104. The identification signal is added on a signal which is outputted from the first charging unit 103. In FIG. 1, the identification signal is a digital encoding signal. The first micro-processing unit 101 is a micro-processor.

The first signal-fetching unit 102 is electrically connected to the first micro-processing unit 101 and the first antenna unit 105. The first signal-fetching unit 102 fetches the responsive identification signal which is received by the first antenna unit 105 and transmitted from the door lock 20. The first signal-fetching unit 102 transmits the responsive identification signal to the first micro-processing unit 101 to determine. In FIG. 1, the first signal-fetching unit 102 is a signal-fetching circuit.

The first charging unit 103 is electrically connected to the first signal-processing unit 104. The first charging unit 103 generates and transmits a direct current pulse wave or a direct current charging pulse wave to the first signal-processing unit 104. The direct current pulse wave or the direct current charging pulse wave is added on the identification signal generated by the first micro-processing unit 101. In FIG. 1, the first charging unit 103 is a wireless charging signal and power supply unit.

The first signal-processing unit 104 is electrically connected to the first micro-processing unit 101 and the first charging unit 103. The first signal-processing unit 104 adds or mixes the signals outputted from the first micro-processing unit 101 and the first charging unit 103. In FIG. 1, the first signal-processing unit 104 is a mixer, a signal adding circuit, a signal superimposed circuit or an antenna driver.

The first antenna unit 105 is electrically connected to the first signal-processing unit 104. The first antenna unit 105 receives the direct current pulse wave or the direct current charging pulse wave outputted from the first charging unit 103 to generate a magnetic electric field, so that the second antenna unit 205 induces or resonates the magnetic electric field to obtain an induced signal. In FIG. 1, the first antenna unit 105 is an electromagnetic coil.

The power supply unit 106 is electrically connected to the first micro-processing unit 101. The power supply unit 106 receives an external alternating current power and converts the external alternating current power into a direct current power to provide the gateway 10 with a required direct current power. In FIG. 1, the power supply unit 106 at least comprises a rectifying circuit and a voltage-stabilizing circuit.

The door lock 20 includes a second micro-processing unit 201, a second signal-fetching unit 202, a second charging unit 203, a second signal-processing unit 204, a second antenna unit 205 and a storage unit 206.

The second micro-processing unit 201 comprises software applications to determine the identification signal which is transmitted from the gateway 10 and fetched by the second signal-fetching unit 202. The second micro-processing unit 201 responds to the identification signal with the responsive identification signal. The second micro-processing unit 201 transmits the responsive identification signal to the second signal-processing unit 204. The second signal-processing unit 204 transmits the responsive identification signal to the first antenna unit 105 through the second antenna unit 205. In FIG. 1, the identification signal is a digital encoding signal, and the responsive identification signal is, for example but not limited to, a digital encoding signal. The second micro-processing unit 201 is a micro-processor.

The second signal-fetching unit 202 is electrically connected to the second micro-processing unit 201 and the second antenna unit 205. The second signal-fetching unit 202 receives the signal which is received by the second antenna unit 205 and transmitted from the gateway 10. The second signal-fetching unit 202 fetches the identification signal and transmits the identification signal to the second micro-processing unit 201 to determine. In FIG. 1, the second signal-fetching unit 202 is a signal-fetching circuit.

The second charging unit 203 is electrically connected to the second antenna unit 205 and the storage unit 206. The second antenna unit 205 induces or resonates the magnetic electric field to obtain the induced signal and then transmits the induced signal to the second charging unit 203. The second charging unit 203 converts the induced signal into a charging direct current to charge the storage unit 206. In FIG. 1, the second charging unit 203 is a wireless charging signal conversion and charging unit.

The second signal-processing unit 204 is electrically connected to the second micro-processing unit 201 and the second antenna unit 205. The second signal-processing unit 204 receives the responsive identification signal transmitted from the second micro-processing unit 201, and then transmits the responsive identification signal to the second antenna unit 205. In FIG. 1, the second signal-processing unit 204 is a mixer, a signal adding circuit or a signal superimposed circuit.

The second antenna unit 205 is electrically connected to the second signal-fetching unit 202, the second charging unit 203 and the second signal-processing unit 204. The second antenna unit 205 receives magnetic signals generated by the first antenna unit 105 by magnetic induction or resonance method. At the same time, the second antenna unit 205 transmits the identification signal which is transmitted by the gateway 10 to the second signal-fetching unit 202. In FIG. 1, the second antenna unit 205 is an electromagnetic coil.

The storage unit 206 is electrically connected to the second charging unit 203 and the second micro-processing unit 201. The storage unit 206 receives the charging direct current outputted from the second charging unit 203, so that the storage unit 206 is charged to provide the door lock 20 with the required power. In FIG. 1, the storage unit 206 is a rechargeable battery, a battery capacitor or a double-layer capacitor.

When the gateway 10 and the door lock 20 are charging, the power supply unit 106 converts the external alternating current power into the direct current power to provide the gateway 10 with the required direct current power.

In the charging process, the first micro-processing unit 101 of the gateway 10 outputs the identification signal to the first signal-processing unit 104, and the first charging unit 103 outputs the direct current pulse wave to the first signal-processing unit 104. The first signal-processing unit 104 mixes or adds the identification signal and the direct current pulse wave and then transmits to the first antenna unit 105 to generate the magnetic electric field to output with resonance or induction method. The magnetic electric field signal comprises the identification signal. The second antenna unit 205 of the door lock 20 proceeds with magnetic induction or resonance to receive the magnetic electric field signal and then outputs to the second charging unit 203 and the second signal-fetching unit 202. The second signal-fetching unit 202 fetches the identification signal and transmits the identification signal to the second micro-processing unit 201 to determine. The second micro-processing unit 201 outputs the responsive identification signal to the second signal-processing unit 204. The second signal-processing unit 204 transmits the responsive identification signal to the second antenna unit 205. The second antenna unit 205 transmits the responsive identification signal to the first antenna unit 105 of the gateway 10. The first antenna unit 105 transmits the responsive identification signal to the first signal-fetching unit 102. Namely, the first signal-fetching unit 102 fetches the responsive identification signal. The first signal-fetching unit 102 transmits the responsive identification signal to the first micro-processing unit 101 to determine whether the identification is successful or not. If the identification is successful, the first charging unit 103 outputs the direct current charging pulse wave electric field through the first antenna 105, so that the second antenna unit 205 induces and then transmits to the second charging unit 203 to convert as the direct current power to charge the storage unit 206.

The identification signal mentioned above is that, for example, the gateway 10 transmits a digital encoding signal '01' to the door lock 20, and the door lock 20 confirms whether the identification signal is the digital encoding signal '01' or not. When the door lock 20 receives and confirms the digital encoding signal '01', the door lock 20 responds to the gateway 10 with the responsive identification signal which is also a digital encoding signal '01'. At this time, the gateway 10 proceeds with the output of the charging signals to generate the charging magnetic field to charge the door lock 20. If the responsive identification signal is not a digital encoding signal '01' (namely, digital encoding signal with different phase), the gateway 10 does not output the charging signal, so that the door lock 20 cannot be charged.

When the second micro-processing unit 201 determines that the storage unit 206 is fully charged, the second micro-processing unit 201 outputs an informing signal to the first antenna unit 105 of the gateway 10 through the second antenna unit 205. The first antenna unit 105 transmits the informing signal to the first micro-processing unit 101 through the first signal-fetching unit 102. The first micro-processing unit 101 will stop driving the first charging unit 103, so that the door lock 20 is not charged.

Figure 2:
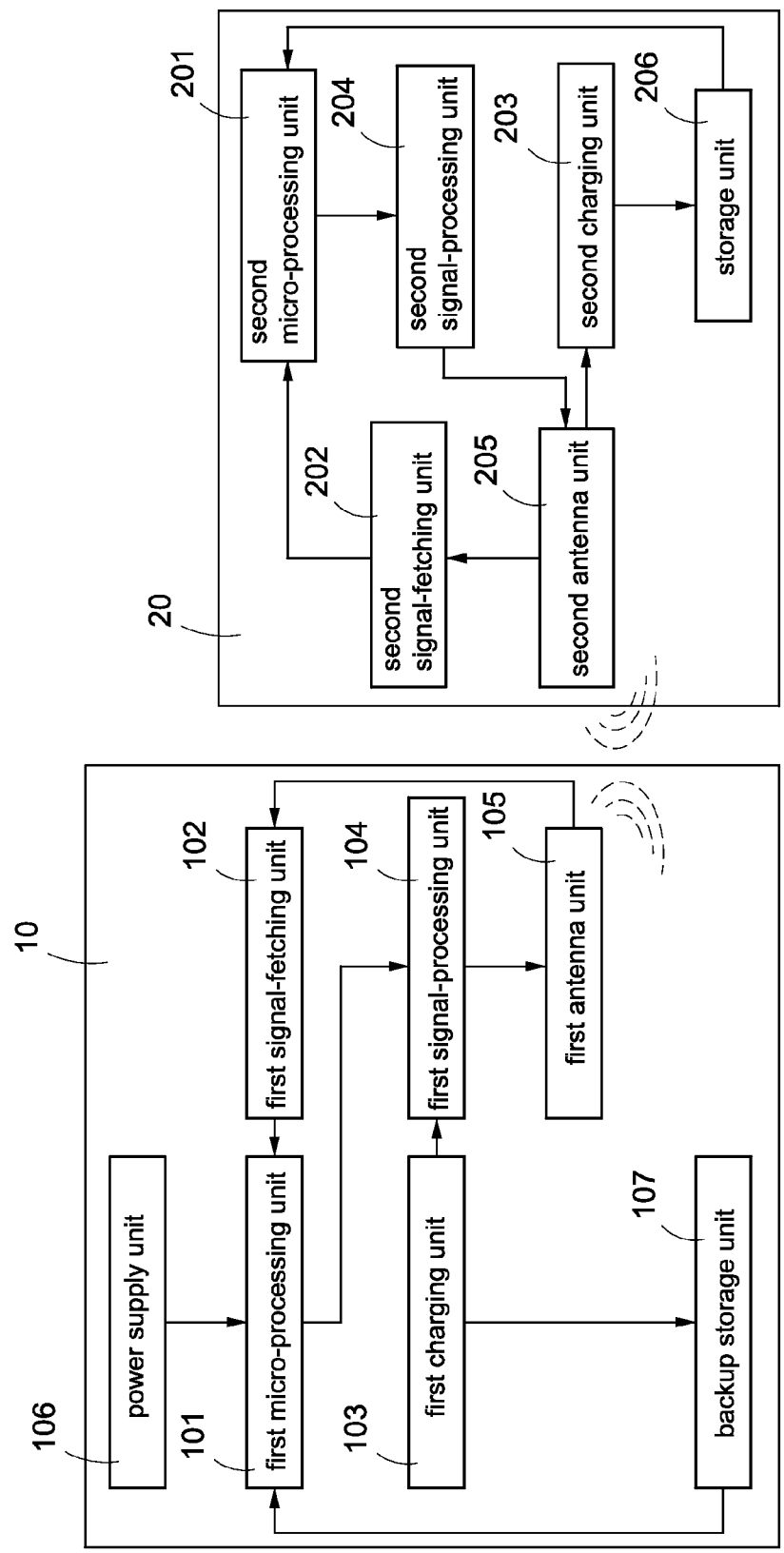
FIG. 2 shows a block diagram of the second embodiment of the lock wireless charging system of the present invention.

FIG. 2 shows a block diagram of the second embodiment of the lock wireless charging system of the present invention. As shown in FIG. 2, the components shown in FIG. 2 are similar to those shown in FIG. 1. Moreover, the gateway 10 further comprises a backup storage unit 107 inside the gateway 10 and electrically connected to the first micro-processing unit 101 and the first charging unit 103. The first charging unit 103 outputs the direct current to charge the backup storage unit 107. When the gateway 10 is working but losing the external power, the backup storage unit 107 will provide the gateway 10 with the required power to ensure that the gateway 10 and the door lock 20 work normally. In FIG. 2, the backup storage unit 107 is a rechargeable battery, a battery capacitor or a double-layer capacitor.

Figure 3:
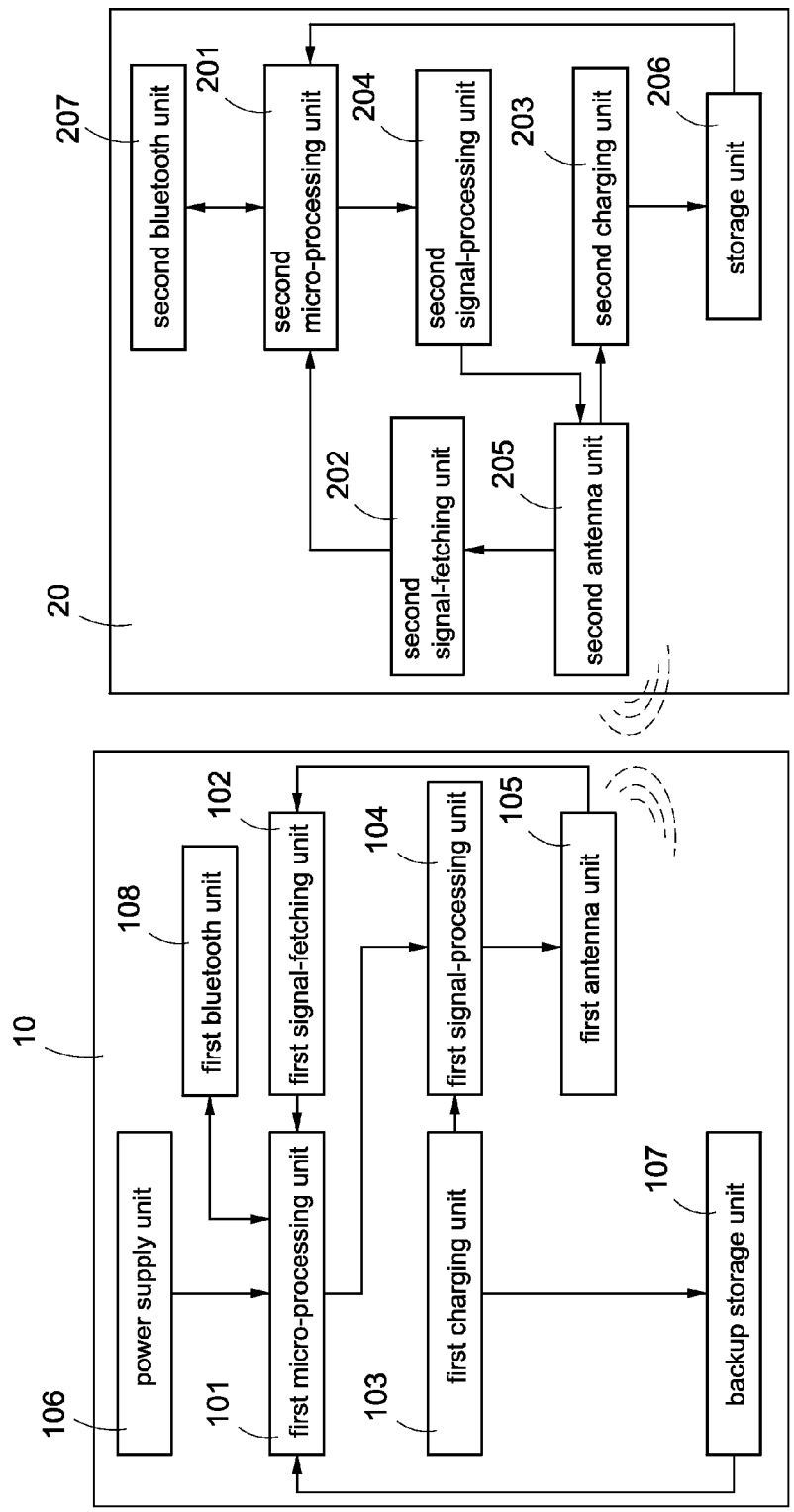
FIG. 3 shows a block diagram of the third embodiment of the lock wireless charging system of the present invention.

FIG. 3 shows a block diagram of the third embodiment of the lock wireless charging system of the present invention. As shown in FIG. 3, the components shown in FIG. 3 are similar to those shown in FIG. 2. Moreover, the gateway 10 further comprises a first Bluetooth unit 108. The door lock 20 further comprises a second Bluetooth unit 207. The first Bluetooth unit 108 is electrically connected to the first micro-processing unit 101. The second Bluetooth unit 207 is electrically connected to the second micro-processing unit 201. When the gateway 10 and the door lock 20 identify to each other by the first Bluetooth unit 108 and the second Bluetooth unit 207, the first micro-processing unit 101 of the gateway 10 generates an identification signal, and then the first Bluetooth unit 108 transmits the identification signal to the second Bluetooth unit 207 of the door lock 20. The second Bluetooth unit 207 transmits the identification signal to the second micro-processing unit 201 to determine. After that, the second micro-processing unit 201 generates a responsive identification signal and transmits the responsive identification signal to the second Bluetooth unit 207. The second Bluetooth unit 207 transmits the responsive identification signal to the first Bluetooth unit 108. The first Bluetooth unit 108 transmits the responsive identification signal to the first micro-processing unit 101 to determine whether the responsive identification signal is correct or not. If the responsive identification signal is correct, the door lock 20 will proceed with the charging action. If the responsive identification signal is incorrect, the door lock 20 will not proceed with the charging action. Moreover, after the first Bluetooth unit 108 is coupled connected to the second Bluetooth unit 207, a signal strength between the first Bluetooth unit 108 and the second Bluetooth unit 207 is detected to obtain a distance between the gateway 10 and the door lock 20, so that the first micro-processing unit 101 controls a charging current outputted from the first charging unit 103 to ensure the safety of the system according to the distance.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A lock wireless charging system comprising:
   a gateway (10); and
   a door lock (20), wherein the gateway (10) comprises:
a first micro-processing unit (101) comprising software applications to output an identification signal and determine a responsive identification signal;
a first signal-fetching unit (102) electrically connected to the first micro-processing unit (101), the first signal-fetching unit (102) fetching the responsive identification signal to transmit the responsive identification signal to the first micro-processing unit (101);
a first charging unit (103) outputting a direct current pulse wave or a direct current charging pulse wave;
a first signal-processing unit (104) electrically connected to the first micro-processing unit (101) and the first charging unit (103), the first signal-processing unit (104) adding signals outputted from the first micro-processing unit (101) and the first charging unit (103); and
a first antenna unit (105) electrically connected to the first signal-processing unit (104) and the first signal-fetching unit (102), the first antenna unit (105) receiving the direct current charging pulse wave or the direct current pulse wave to generate a signal output of an magnetic electric field,
wherein the door lock (20) comprises:
a second antenna unit (205) inducing or resonating to receive an electromagnetism generated by the first antenna unit (105) to output;
a second signal-fetching unit (202) electrically connected to the second antenna unit (205), the second signal-fetching unit (202) fetching the identification signal transmitted by the gateway (10);
a second micro-processing unit (201) electrically connected to the second signal-fetching unit (202), the second micro-processing unit (201) comprising software applications to receive the identification signal transmitted by the gateway (10) and transmit the responsive identification signal;
a second signal-processing unit (204) electrically connected to the second micro-processing unit (201) and the second antenna unit (205), the second signal-processing unit (204) receiving the responsive identification signal and transmitting the responsive identification signal to the second antenna unit (205), and then the second antenna unit (205) transmitting the responsive identification signal to the gateway (10);
a second charging unit (203) electrically connected to the second antenna unit (205), the second charging unit (203) receiving magnetic field signals of the second antenna unit (205) and converting the magnetic field signals into a charging direct current to output; and
a storage unit (206) electrically connected to the second charging unit (203) and the second micro-processing unit (201), the storage unit (206) receiving the charging direct current outputted by the second charging unit (203) to charge the storage unit (206), the storage unit (206) providing the door lock (20) with a required power,
wherein the first micro-processing unit (101) outputs the identification signal to the first signal-processing unit (104), and the first charging unit (103) outputs the direct current pulse wave to the first signal-processing unit (104); after the first signal-processing unit (104) adds the identification signal by the direct current pulse wave, the first signal-processing unit (104) transmits the identification signal added by the direct current pulse wave to the second antenna unit (205) of the door lock (20) through the first antenna unit (105); the second signal-fetching unit (202) fetches the identification signal to transmits the identification signal to the second micro-processing unit (201) to determine; the second micro-processing unit (201) outputs the responsive identification signal to the first antenna unit (105) of the gateway (10) through the second signal-processing unit (204) and the second antenna unit (205); the first signal-fetching unit (102) fetches the responsive identification signal and transmits the responsive identification signal to the first micro-processing unit (101) to determine; after the first micro-processing unit (101) determines the responsive identification signal is correct, the first charging unit (103) outputs the direct current charging pulse wave to the first antenna unit (105) to output and form an electric field to the second antenna unit (205); the second charging unit (203) converts to charge the storage unit (206).

2. The lock wireless charging system in claim 1, wherein the first micro-processing unit (101) is a micro-processor, and the second micro-processing unit (201) is a micro-processor.

3. The lock wireless charging system in claim 1, wherein the first signal-fetching unit (102) is a signal-fetching circuit, and the second signal-fetching unit (202) is a signal-fetching circuit.

4. The lock wireless charging system in claim 1, wherein the first signal-processing unit (104) is a signal adder, a mixer or an antenna driver; the second signal-processing unit (204) is a signal adder, a mixer or an antenna driver.

5. The lock wireless charging system in claim 1, wherein the first charging unit (103) is a wireless charging signal and power supply unit.

6. The lock wireless charging system in claim 1, wherein the second charging unit (203) is a wireless charging signal conversion and charging unit.

7. The lock wireless charging system in claim 1, wherein the first antenna unit (105) is an electromagnetic coil; the second antenna unit (205) is an electromagnetic coil.

8. The lock wireless charging system in claim 1, wherein the gateway (10) further comprises a power supply unit (106) electrically connected to the first micro-processing unit (101); the power supply unit (106) receives an external alternating current power and converts the external alternating current power into a direct current power to provide the gateway (10) with a required direct current power; the power supply unit (106) at least comprises a rectifying circuit and a voltage-stabilizing circuit.

9. The lock wireless charging system in claim 1, wherein the gateway (10) further comprises a backup storage unit (107) electrically connected to the first charging unit (103).

10. The lock wireless charging system in claim 9, wherein the storage unit (206) is a rechargeable battery, a battery capacitor or a double-layer capacitor; the backup storage unit (107) is a rechargeable battery, a battery capacitor or a double-layer capacitor.

11. The lock wireless charging system in claim 1, wherein the identification signal is a digital encoding signal.

12. The lock wireless charging system in claim 1, wherein the gateway (10) further comprises a first Bluetooth unit (108); the door lock (20) further comprises a second Bluetooth unit (207); the first Bluetooth unit (108) is electrically connected to the first micro-processing unit (101) of the gateway (10); the second Bluetooth unit (207) is electrically connected to the second micro-processing unit (201) of the door lock (20); the gateway (10) and the door lock (20) communicate with each other by the first Bluetooth unit (108) and the second Bluetooth unit (207).

13. The lock wireless charging system in claim 12, wherein after the first Bluetooth unit (108) is coupled connected to the second Bluetooth unit (207), a signal strength between the first Bluetooth unit (108) and the second Bluetooth unit (207) is detected to obtain a distance between the gateway (10) and the door lock (20), so that the first micro-processing unit (101) controls a charging current outputted from the first charging unit (103) according to the distance.

\* \* \* \* \*